(12) United States Patent
Liu et al.

(10) Patent No.: US 8,359,077 B2
(45) Date of Patent: Jan. 22, 2013

(54) ANTENNA MATCHING STRUCTURE, ANTENNA MATCHING METHOD AND WIRELESS COMMUNICATION TERMINAL

(75) Inventors: Yinong Liu, Beijing (CN); Sheng-Bing Chen, Beijing (CN)

(73) Assignee: Sony Mobile Communications AB, Lund (SE)

( * ) Notice: Subject to any disclaimer, the term of this patent is extended or adjusted under 35 U.S.C. 154(b) by 0 days.

(21) Appl. No.: 13/220,943

(22) Filed: Aug. 30, 2011

(65) Prior Publication Data

US 2012/0064894 A1 Mar. 15, 2012

(30) Foreign Application Priority Data

Sep. 10, 2010 (CN) .......................... 2010 1 0277701

(51) Int. Cl.
*H04M 1/00* (2006.01)
(52) U.S. Cl. .................................................. 455/575.7
(58) Field of Classification Search ............... 455/552.1, 455/436, 452.2, 550.1, 562.1, 120, 73, 437, 455/226.2, 419, 67.11, 77, 561, 114.2, 292; 370/329, 252; 333/32, 17.3, 2
See application file for complete search history.

(56) References Cited

U.S. PATENT DOCUMENTS

| 6,862,432 B1 | 3/2005 | Kim | |
|---|---|---|---|
| 2008/0068271 A1* | 3/2008 | Iwai et al. | 343/702 |
| 2008/0242346 A1* | 10/2008 | Rofougaran et al. | 455/552.1 |
| 2009/0231220 A1 | 9/2009 | Zhang et al. | |
| 2010/0105425 A1* | 4/2010 | Asokan | 455/552.1 |

FOREIGN PATENT DOCUMENTS

| CN | 1674452 A | 9/2005 |
|---|---|---|
| CN | 102111490 A | 6/2011 |
| WO | 2005104381 A1 | 11/2005 |
| WO | 2006089020 A1 | 8/2006 |

OTHER PUBLICATIONS

European Search Report, corresponding to EP 11 00 7336, date of completion of the search Jan. 16, 2012 and Written Opinion.

* cited by examiner

*Primary Examiner* — Kiet Doan
(74) *Attorney, Agent, or Firm* — Renner, Otto, Boisselle & Sklar, LLP

(57) ABSTRACT

The present invention relates to an antenna matching structure, an antenna matching method and a wireless communication terminal. In which, the antenna matching structure comprising: a measuring unit configured to measure a RSSI value; a control unit configured to generate a first switching control signal when the RSSI value measured by the measuring unit is less than a predetermined threshold; and a parameter switching unit configured to select one set of matching parameters from predetermined at least one set of matching parameters according to the first switching control signal, and switch current matching parameters of the adjustable antenna matching circuit to the selected matching parameters. According to the embodiments of the present invention, a higher RSSI value can be acquired to ensure the signal transmission quality.

19 Claims, 4 Drawing Sheets

ANTENNA MATCHING STRUCTURE, ANTENNA MATCHING METHOD AND WIRELESS COMMUNICATION TERMINAL

FIELD OF THE INVENTION

The present invention relates to an antenna matching technology, and particularly, to a wireless communication terminal, as well as an antenna matching structure and an antenna matching method for the wireless communication terminal.

DESCRIPTION OF THE RELATED ART

Wireless communication terminals such as cell phones are all provided with antennas and antenna matching circuits, wherein the antenna matching circuit is used to ensure the transmitting and receiving qualities of the antenna through the matching of impedance of the antenna.

Presently, for whether a single band or a multiband wireless communication terminal, the antenna matching circuit is usually fixed, and the antenna matching design is carried out considering the whole band or multiple bands; thus the design of the antenna matching circuit is a compromised design for the supported whole band or multiple bands. In other words, the design of the matching circuit may be not the best to a specified channel in the working band, but it works. In the actual network, the environment (e.g., hand held, placed on head, etc.) of the terminal will often change, and then corresponding antenna impedance will also change. Thus the matching between the antenna matching circuit and the antenna may be very poor, which affects the transmitting and receiving performances of the antenna, and increases the power consumption.

Thus, variable matching circuits have been developed in the prior art. The variable matching circuits adjust the impedance of the matching circuit by using variable capacitor and variable inductor, so as to adapt to different environments. For example, a Chinese patent application No. CN200410083968.1 provides a matched circuit for a mobile communication terminal antenna and method, the method comprising: detecting a state change of a mobile communication terminal (e.g., when the cover is opened or closed, the earphone is connected, the call is connected, or the phone comes into stand-by state), determining an antenna working environment of the mobile communication terminal according to the detected state change, and selecting one of a plurality of matching circuits according to the determined antenna working environment, so as to switch to the selected matching circuit. By selecting an appropriate matching circuit, the method improves the signal transmission performance and the communication success rate, and stables the communication quality.

SUMMARY OF THE INVENTION

However, a disadvantage of the above method is that the state change of the mobile communication terminal is continuously detected, and the matching circuit is switched once the state is changed, which increases the power consumption of the mobile communication terminal.

The present invention is provided in view of the problem of the prior art. The present invention is devoted to provide a wireless communication terminal, as well as an antenna matching structure and an antenna matching method for the wireless communication terminal, so as to overcome one or more problems or defects due to the limitation of the prior art, and provide at least one beneficial choice.

According to an aspect of the present invention, an antenna matching structure for a wireless communication terminal is provided, including an adjustable antenna matching circuit, wherein the antenna matching circuit including: a measuring unit configured to measure a RSSI value (received signal strength indicator); a control unit configured to generate a first switching control signal when the RSSI value measured by the measuring unit is less than a predetermined threshold; and a parameter switching unit configured to select one set of matching parameters from predetermined at least one set of matching parameters according to the first switching control signal, and switch current matching parameters of the adjustable antenna matching circuit to the selected matching parameters.

According to an aspect, the wireless communication terminal is a multiband wireless communication terminal.

According to an aspect, the predetermined at least one set of matching parameters are at least one set of matching parameters corresponding to a current working frequency band.

According to an aspect, the control unit is further configured to generate a second switching control signal when the wireless communication terminal performs a network search or a cell handover; and the parameter switching unit is further configured to switch current matching parameters of the adjustable antenna matching circuit to default matching parameters according to the second switching control signal.

According to an aspect, the control unit is further configured to generate a third switching control signal after the wireless communication terminal completes the network search or the cell handover; and the parameter switching unit is further configured to switch the default matching parameters to a set of matching parameters corresponding to the current working frequency band according to the third switching control signal.

According to an aspect, the at least one set of matching parameters are corresponding to at least one antenna working environment.

According to an aspect, the antenna matching structure further including: an environment detecting unit configured to detect an antenna working environment of the wireless communication terminal; the parameter switching unit preferentially selects a set of matching parameters corresponding to the antenna working environment detected by the environment detecting unit, from the predetermined at least one set of matching parameters according to the first switching control signal, and switches current matching parameters of the adjustable antenna matching circuit to the selected matching parameters.

According to an aspect, the environment detecting unit including: a hand held state detecting unit configured to detect whether the wireless communication terminal is in a hand held state; a call state detecting unit configured to detect whether the wireless communication terminal is in a call state; and/or an earphone state detecting unit configured to detect whether an earphone interface is in an operation state; and a determining unit configured to determine the antenna working environment according to the detection results of the hand held state detecting unit, the call state detecting unit and/or the earphone state detecting unit.

According to an aspect, the antenna matching structure further including: a parameter adjusting unit and a change detecting unit; the control unit is further configured to generate an adjustment control signal when the number of times of generating the first switching control signal exceeds a predetermined number of times, during a period of continuous receptions of RSSI values less than the predetermined threshold; the parameter adjusting unit is configured to adjust matching parameters of adjustable elements in the adjustable antenna matching circuit based on a predetermined adjustment amount according to the adjustment control signal, and further forwardly or reversely adjust current matching parameters according to a forward adjustment signal or a reverse adjustment signal fed back by the change detecting unit; and the change detecting unit is configured to, after the parameter adjusting unit adjusts matching parameters of the adjustable elements each time, detect a change of the RSSI value measured by the measuring unit, generate the forward adjustment signal or the reverse adjustment signal according to the change of the RSSI value, and feed back the generated forward adjustment signal or reverse adjustment signal to the parameter adjusting unit.

According to another aspect of the present invention, a wireless communication terminal is provided with the previous antenna matching structure.

According to another aspect of the present invention, an antenna matching method for a wireless communication terminal, includes the steps of: a measuring step: measuring a RSSI value; and a first switching step: when the measured RSSI value is less than a predetermined threshold, selecting a set of matching parameters from predetermined at least one set of matching parameters, and switching current matching parameters of an adjustable antenna matching circuit to the selected matching parameters.

According to an aspect, the predetermined at least one set of matching parameters are at least one set of matching parameters corresponding to a current working frequency band, when the wireless communication terminal is a multi-band wireless communication terminal.

According to an aspect, the method further including: a second switching step: switching current matching parameters of the adjustable antenna matching circuit to default matching parameters, when the wireless communication terminal performs a network search or a cell handover.

According to an aspect, when the wireless communication terminal is a multiband wireless communication terminal, the method further including: a third switching step: switching the default matching parameters to a set of matching parameters corresponding to the current working frequency band, after the wireless communication terminal completes a network search or a cell handover.

According to an aspect, the at least one set of matching parameters are corresponding to at least one antenna working environment, and the method further including: an environment detecting step: detecting an antenna working environment of the wireless communication terminal.

According to an aspect, the first switching step including: preferentially selecting a set of matching parameters corresponding to the antenna working environment detected by the environment detecting step, from the predetermined at least one set of matching parameters, and switching current matching parameters of the adjustable antenna matching circuit to the selected matching parameters.

According to an aspect, the environment detecting step including: a hand held state detecting step that detects whether the wireless communication terminal is in a hand held state, a call state detecting step that detects whether the wireless communication terminal is in a call state, and/or an earphone state detecting step that detects whether an earphone interface is in an operation state; and a step that determines the antenna working environment according to the detection results of the hand held state detecting step, the call state detecting step and/or the earphone state detecting step.

According to an aspect, the method further including: adjusting matching parameters of adjustable elements in the adjustable antenna matching circuit based on a predetermined adjustment amount when the number of times of repeatedly performing the first switching step exceeds a predetermined number of times, during a period of continuous receptions of RSSI values less than the predetermined threshold; and detecting a change of the RSSI value, and further forwardly or reversely adjusting matching parameters of the adjustable elements according to the change.

The wireless communication terminal, as well as the antenna matching structure and the antenna matching method for the wireless communication terminal according to the embodiments of the present invention can quickly perform a switching of matching parameters according to the RSSI value, so as to ensure a good RSSI value and improve the signal transmission performance.

Many aspects of the present invention will be understood better with reference to the following drawings. Elements and features described in a drawing or an embodiment of the present invention can be combined with elements and features illustrated in one or more other drawings or embodiments. In addition, same or corresponding reference signs are used to represent same or corresponding constituent parts in all the drawings, and they also can be used to represent same or corresponding constituent parts in more than one embodiment.

BRIEF DESCRIPTION OF THE DRAWINGS

The accompanying drawings constitute a part of the specification, illustrate the embodiments of the present invention and together with the description serve to explain the present invention. Obviously, the drawings described as follows are just some embodiments of the present invention, and a person skilled in the art can obtain other drawings based on these drawings without paying any creative effort. In the drawings.

DETAILED DESCRIPTION OF THE PREFERRED EMBODIMENTS

The embodiments of the present invention will be detailedly described as follows in conjunction with the accompanying drawings. In the following descriptions, the details are illustrated for the purpose of explanation instead of limitation, so as to help a complete understanding of the present invention. However, it will be apparent to a person skilled in the art that the present invention can be carried out in other embodiments deviating from these details.

To be noted, in order to avoid the present invention from being vague due to unnecessary details, the drawings only illustrate device structures and/or processing steps closely related to the solution according to the present invention, while omit other details not so closely related or necessary to understand the invention.

A Received Signal Strength Indicator (RSSI) is a reverse signal strength indicator, which indicates the strength of the reverse signal received by base station within a frequency band of 1.2288M (MHz-megahertz), for example. Whether the RSSI is normal is an important index that indicates whether the reverse channel works normally, and it has obvious influences on communication quality, call dropping, switching and congestion as well as network coverage and capacity. Presently, the RSSI value can be easily measured at the side of the wireless communication terminal. In the embodiments of the present invention, switching of the matching circuit, i.e., changing of the matching parameters of the matching circuit, is performed based on the RSSI value.

Figure 1:
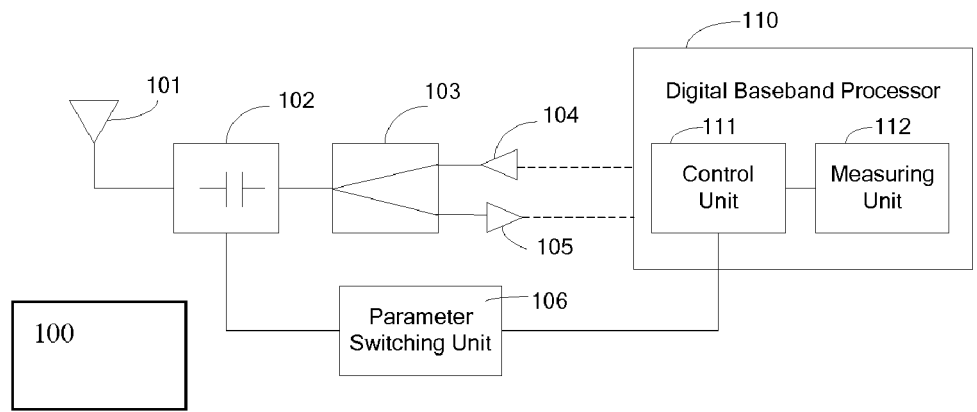
FIG. 1 is a block diagram of an antenna matching structure according to an embodiment of the present invention.

FIG. 1 is a block diagram of an antenna matching structure of a wireless communication terminal according to an embodiment of the present invention. As illustrated in FIG. 1, the antenna matching structure includes: an antenna 101, an adjustable antenna matching circuit 102, a duplexer 103, a power amplifier 104 in a transmission path, a power amplifier 105 in a reception path, and a parameter switching unit 106 and a digital baseband processor 110. The duplexer 103 is capable of providing transmitting and receiving signals on two reverse directions. In the embodiment, the digital baseband processor 110 is provided with a control unit 111 and a RSSI measuring unit 112.

The measuring unit 112 is configured to measure a RSSI value, and provide the measured RSSI value to the control unit 111. The control unit 111 is configured to generate a first switching control signal when the RSSI value is less than a predetermined threshold. Herein the predetermined threshold may be an appropriate value obtained through tests, e.g., −90 dBm, or other values. In FIG. 1, although the measuring unit 112 and the control unit 111 are provided inside the digital baseband processor 110, they can also be provided outside the digital baseband processor 110 and designed individually.

The parameter switching unit 106 is configured to select one set of matching parameter(s) from predetermined at least one set of matching parameter(s) according to the first switching control signal, and switch current matching parameter(s) of the adjustable antenna matching circuit 102 to the selected matching parameter(s). The parameter switching unit 106 may switch the parameter(s) of the matching circuit via a serial bus interface (SBI). In FIG. 1, although the parameter switching unit 106 is provided outside the digital baseband processor 110, it can also be provided inside the digital baseband processor 110.

A set of matching parameters include a capacitance value and/or an inductance value in the matching circuit, and different matching parameters are corresponding to different matching impedance values. Herein the predetermined at least one set of matching parameters may be one or more sets of matching parameters, and for example may be matching parameters trained according to different antenna working environments in the laboratory. In case the wireless communication terminal is a single band wireless communication terminal, the predetermined matching parameters for example may be optimum antenna matching parameters under different antenna working environments (e.g., environments with the states of free space, being hand held, being placed on head, and being hand held and Placed on head simultaneously).

In case the wireless communication terminal is a multiband wireless communication terminal, for example a wireless communication terminal that supports two or more of the bands of the Global System for Mobile Communications (GSM) 850 MHz, GSM 900 MHz, Digital Cellular System (DCS) 1800 MHz, Personal Communications System (PCS) 1900 MHz, Universal Mobile Telecommunications System (UMTS), the predetermined at least one set of matching parameters are preferably at least one set of matching parameters corresponding to the current working frequency band.

For example, when the current working frequency band is UMTS Band I, the predetermined matching parameters may be four sets of matching parameters corresponding to the UMTS Band I, as shown in Table 1.

TABLE 1

| Environment | Free space | Hand held | Placed on head | Hand held and placed on head |
|---|---|---|---|---|
| Matching parameter | Matching parameter 1 | Matching parameter 2 | Matching parameter 3 | Matching parameter 4 |

In table 1, the four sets of matching parameters (matching parameters 1, 2, 3, 4) are matching parameters trained in advance according to different working environments of the antenna of terminal in the laboratory.

In the embodiment of the present invention, after the parameter switching unit 106 performs a switching of the matching parameters, the measuring unit 112 continues to measure the RSSI value, and if the RSSI value becomes larger than the predetermined threshold (e.g., −90 dBm), the switched matching parameters will be maintained. So long as the RSSI value is still less than the predetermined threshold, the control unit 111 further generates a first switching control signal, and then the parameter switching unit 106 continuously selects another set of matching parameters for a new switching, from the predetermined at least one set of matching parameters according to the first switching control signal, until the RSSI value is larger than the predetermined threshold or the number of times of continuous switching by the parameter switching unit 106 exceeds a predetermined value.

A good RSSI value is ensured by switching (adjusting) the matching parameters of the matching circuit according to the previously measured RSSI value, and the antenna transmission quality can be ensured even in a region where the signal is weak, thus the signal transmission performance is improved.

Figure 2:
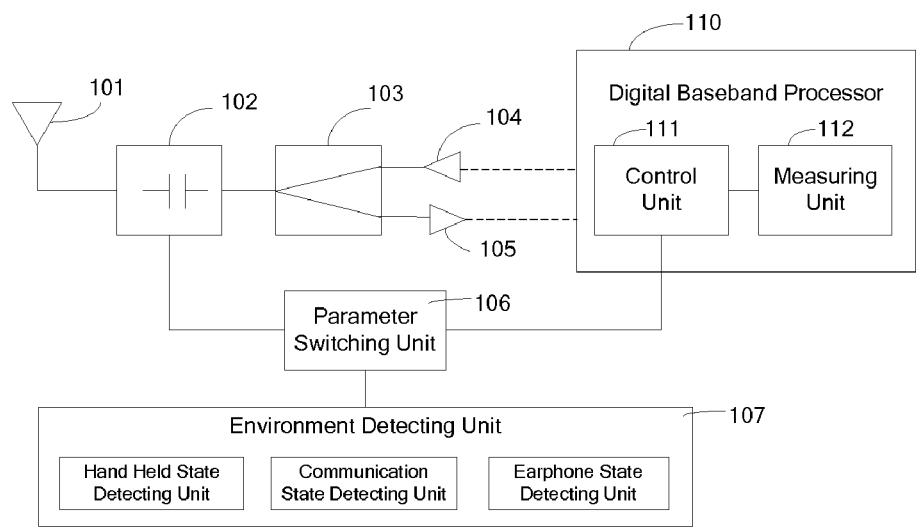
FIG. 2 is a block diagram of an antenna matching structure according to another embodiment of the present invention.

Since the various sets of matching parameters in table 1 are corresponding to different antenna working environments, in another embodiment of the present invention as illustrated in FIG. 2, the antenna matching structure may further include an environment detecting unit 107 configured to detect an antenna working environment. Thus, the parameter switching unit 106 may preferentially select a set of matching parameters corresponding to the antenna working environment detected by the environment detecting unit 107, from the predetermined at least one set of matching parameters according to the first switching control signal, and switch the current matching parameters of the antenna matching circuit to the selected matching parameters, so as to acquire the optimum matching more quickly.

As an example, the environment detecting unit 107 may include a determining unit and at least one of a hand held state detecting unit, a call state detecting unit and an earphone state detecting unit. The hand held state detecting unit is configured to detect whether a terminal is in a hand held state. The call state detecting unit is configured to detect whether a terminal is in a call state. The earphone state detecting unit is configured to detect whether an earphone interface of a terminal is in a working state. The determining unit (not shown) is configured to determine an antenna working environment according to the detection results of the hand held state detecting unit, the call state detecting unit and/or the earphone state detecting unit. The hand held state detecting unit may be an element for detecting a terminal state, e.g., a pressure sensor or acceleration sensor. Such element is disclosed in a Chinese patent application No CN200910259901.1 which is incorporated herein by reference. As an example, when it is acquired that the terminal is in the hand held state and the call state simultaneously while the earphone interface does not operate, according to the detection results of the hand held state detecting unit, the call state detecting unit and the earphone state detecting unit, the determining unit may determine that the terminal is hand held and placed on the head. When it is acquired that the terminal is in the hand held state and the call state simultaneously while the earphone interface operates, the determining unit may determine that the terminal is only hand held. When it is acquired that the terminal is in the hand held state while not in the call state according to the detection results of the hand held state detecting unit and the call state detecting unit, the determining unit may determine that the terminal is only hand held. There are many other ways for determining the antenna working environments, and herein are not listed.

In addition, the control unit 111 may generate a second switching control signal when the wireless communication terminal performs a network search or a cell handover. The parameter switching unit 106 may switch current matching parameters of the adjustable antenna matching circuit 102 to default matching parameters. The default matching parameters may be matching parameters general to various bands, i.e., compromised matching parameters for multiple bands. By using the default matching parameters, the network search or the cell handover may be performed easily and quickly within the whole hand.

In case the wireless communication terminal is a multiband wireless communication terminal, the control unit 111 may generate a third switching control signal after the wireless communication terminal completes the network search or the cell handover. According to the third switching control signal, the parameter switching unit 106 may switch the default matching parameters to a set of matching parameters corresponding to the current working frequency band. This set of matching parameters may be general band parameters within the current working frequency band, or be any one or a preferable one of the matching parameters corresponding to different antenna working environments under the current working frequency band. For example, when the current working frequency band is UMTS Band I after the network search and the cell handover, the switched matching parameters may be general matching parameters within UMTS Band I (matching parameter 0 in Table 2), or a certain set of matching parameters among a plurality of matching parameters (matching parameters 1 to 4) corresponding to different environments.

TABLE 2

Five Sets of Matching Parameters Corresponding to UMTS Band I When the Current Working Frequency Band is UMTS Band I

| Environment | Any environment | Free space | Hand held | Placed on head | Hand held and placed on head |
|---|---|---|---|---|---|
| Matching parameter | Matching parameter 0 | Matching parameter 1 | Matching parameter 2 | Matching parameter 3 | Matching parameter 4 |

The five sets of matching parameters in Table 2 are also trained in advance.

Table 3 shows respective general matching parameters within different working frequency bands in a multiband wireless communication terminal according to an embodiment of the present invention.

TABLE 3

Matching Parameters Corresponding to Different Working Frequency Bands

| Band | Matching parameter |
|---|---|
| All bands | Default parameter |
| GSM 850 | Matching parameter 5 |
| GSM 900 | Matching parameter 6 |
| DCS 1800 | Matching parameter 7 |
| PCS 1900 | Matching parameter 8 |
| UMTS I | Matching parameter 0 |
| UMTS II | Matching parameter 9 |
| UMTS V | Matching parameter 10 |

The matching parameters in Table 3 are also trained in advance. In Table 3, the matching parameters corresponding to each band are respective general matching parameters in each band. In addition, each band may be provided in advance with one or more sets of dedicated matching parameters adapted to different antenna working environments. When the RSSI value is less than the predetermined threshold, the parameter switching unit 106 may select a set of matching parameters for a switching, from matching parameters corresponding to different environments according to the first switching control signal generated by the control unit 111.

The matching parameters as shown in Tables 1 to 3 are stored in advance in the wireless communication terminal.

Figure 3:
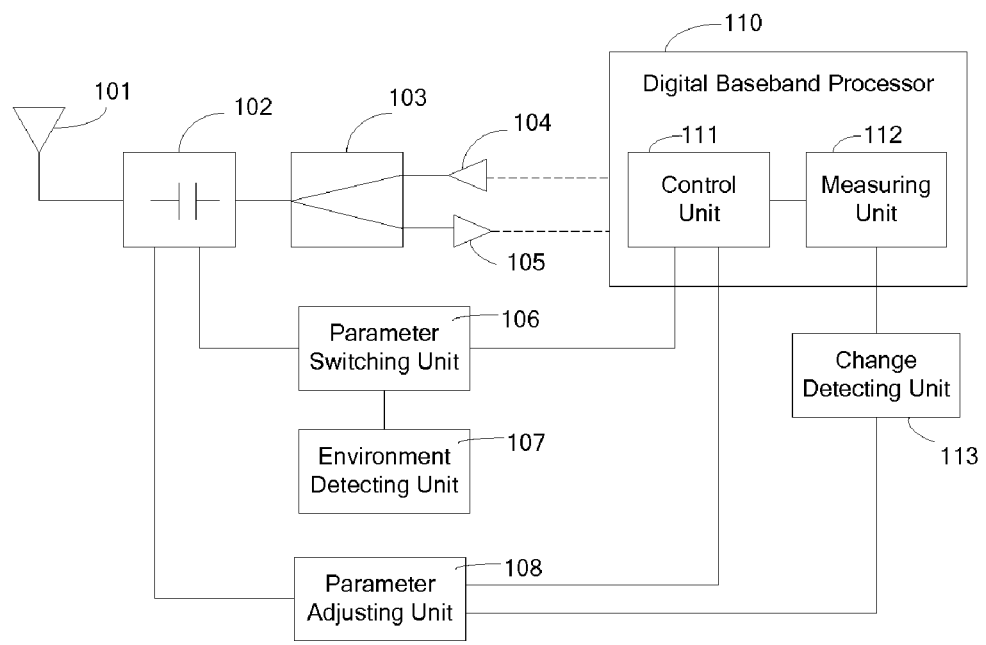
FIG. 3 is a block diagram of an antenna matching structure according to another embodiment of the present invention.

As mentioned above, when the matching parameters are to be switched, the control unit 111 generates the first switching control signal when the RSSI value is less than the predetermined threshold, while the parameter switching unit 106 selects different matching parameters continually for a switching, from the predetermined at least one set of matching parameters according to the first switching control signal, until the RSSI value is larger than the predetermined threshold. However, there might be such a case that the RSSI value is still less than the predetermined threshold even after the current matching parameters are sequentially switched to respective sets of parameters in the predetermined matching parameters by the parameter switching unit. In that case, in order to realize a better antenna matching, in another embodiment of the present invention as illustrated in FIG. 3, the antenna matching structure further includes: a parameter adjusting unit 108 and a RSSI change detecting unit 113. The parameter adjusting unit 108 is configured to minutely adjust parameters of adjustable elements in an antenna matching circuit. The change detecting unit 113 is configured to detect a change of the RSSI value, and feed back the change of the RSSI value to the parameter adjusting unit 108. The parameter adjusting unit 108 can realize an optimization of the parameters of the adjustable elements according to the change of the RSSI value.

The control unit 111 generates an adjustment control signal, when the number of times of generating the first switching control signal exceeds a predetermined number of times (the predetermined number of times for example may be the number of sets of matching parameters corresponding to different environments, or 1 plus the number of sets of matching parameters corresponding to different environments) during a period of continuous receptions of RSSI values less than the predetermined threshold. The parameter adjusting unit 108 adjusts (increases or decreases) parameters of adjustable elements in the antenna circuit based on a predetermined adjustment amount according to the adjustment control signal. The parameter adjusting unit 108 for example may adjust the parameters of the matching circuit via a serial bus interface (SBI).

After the parameter adjusting unit 108 adjusts the parameters of the adjustable elements, the change detecting unit 113 detects a change of a RSSI value measured by the measuring unit 112, generates a forward adjustment signal or a reversed adjustment signal according to the change of the RSSI value, and feeds back to the parameter adjusting unit 108.

The parameter adjusting unit 108 further forwardly or reversely adjusts the current matching parameters according to the forward adjustment signal or the reversed adjustment signal fed back by the detecting unit 113.

In FIG. 3, although the parameter adjusting unit 108 and the change detecting unit 113 are provided outside the digital baseband processor 110, they may also be provided inside the digital baseband processor 110.

Figure 4:
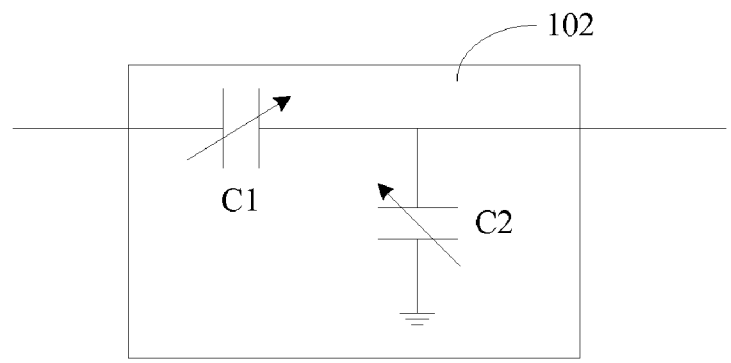
FIG. 4 is an exemplary circuit diagram of an adjustable antenna matching circuit according to an embodiment of the present invention.

For example, when the antenna matching circuit 102 has a circuit form as illustrated in FIG. 4, the adjustable elements are capacitors C1 and C2, and the adjustment process of the adjustable elements by the parameter adjusting unit 108 is as follows:

Firstly, the parameter adjusting unit 108 slightly increases the value of the capacitor C1 in the matching circuit 102 (e.g., increases by a small adjustment amount), and the measuring unit 112 will generate a new RSSI value in response to the change of the value of C1. When the RSSI value is increased, the value of the capacitor C1 will be continuously and slightly increased (i.e., forward adjustment), and the change of the RSSI value will be continuously detected, until the RSSI value is no longer increased. On the contrary, when the RSSI value is decreased, the parameter adjusting unit 108 then slightly decreases the value of the capacitor C1 (i.e., reverse adjustment) continuously and slightly to increase the RSSI value, until the RSSI value is no longer increased.

Or the parameter adjusting unit 108 may slightly decrease the value of the capacitor C1 in the matching circuit 102 (e.g., decrease by a small adjustment amount), and the measuring unit 112 will generate a new RSSI value in response to the change of the value of C1. When the RSSI value is increased, the value of the capacitor C1 will be continuously and slightly decreased (i.e., forward adjustment) and the change of the RSSI value will be continuously detected, until the RSSI value is no longer increased. On the contrary, when the RSSI value is decreased, the parameter adjusting unit 108 then slightly increases the value of the capacitor C1 (i.e., reverse adjustment) continuously and slightly to increase the RSSI value, until the RSSI value is no longer increased.

Next, the value of the capacitor c2 in the matching circuit 102 is adjusted (increased or decreased) in a way same as that adopted to adjust C1, so as to increase the RSSI value and achieve a maximum RSSI value. The optimum matching point can be found by acquiring the maximum RSSI value.

In the above adjustment of C1 and C2, C1 is adjusted firstly and then C2 is adjusted, or C2 may be adjusted firstly and then C1 is adjusted.

During the acquisition of the maximum RSSI value by adjusting C1/C2, in order to promote the acquisition of the optimum antenna matching structure, in the preferred embodiments of the present invention, the matching parameters of the matching circuit may be firstly switched to a set of matching parameters corresponding to a higher RSSI value under the current environment among the stored matching parameters corresponding to the current working frequency band, prior to adjusting C1/C2, and on this basis, adjust C1/C2.

Figure 5:
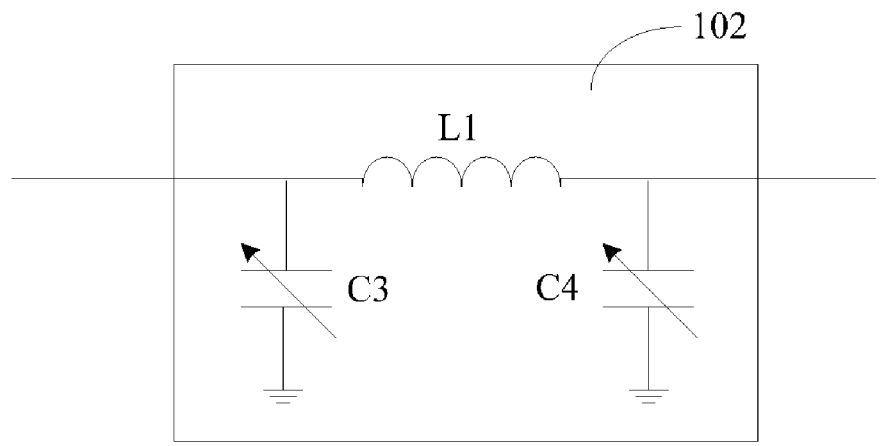
FIG. 5 is an exemplary circuit diagram of an adjustable antenna matching circuit according to another embodiment of the present invention.
Figure 6:
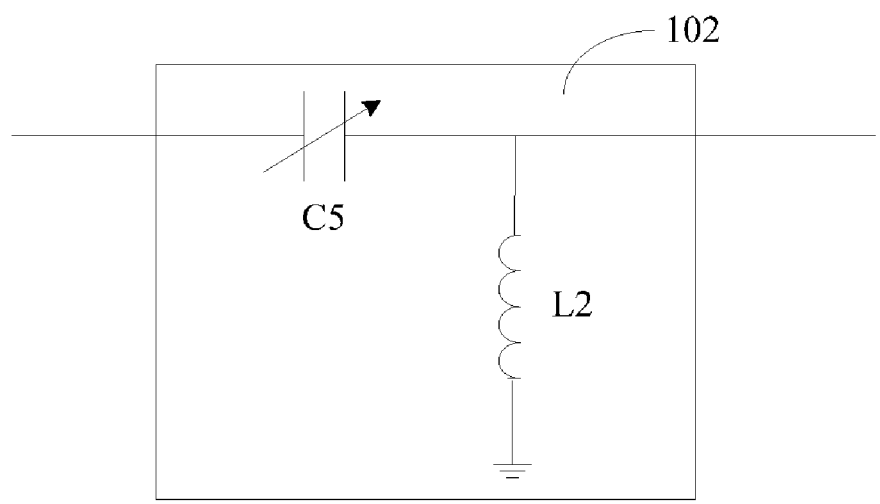
FIG. 6 is an exemplary circuit diagram of an adjustable antenna matching circuit according to another embodiment of the present invention.

FIG. 4 just illustrates an example of the matching circuit, and in practice there may be many forms of matching circuits, such as the forms of matching circuits as illustrated in FIGS. 5 and 6, which include, for example, respectively, capacitors C3, C4 and C5 and inductors L1 and L2, and other forms of matching circuits. For any adjustable capacitor or inductor in these forms of matching circuits, an adjustment may be carried out by using the above adjustment way for C1.

It shall be appreciated that the above components may be implemented by hardware, software, firmware or a combination thereof. Further, the above components may be combined as a larger component or divided into multiple smaller components.

The present invention can easily find the optimum working point for the antenna matching circuit by using the change detecting unit 113 and the parameter adjusting unit 108. In addition, before the optimum working point is acquired by using the change detecting unit 113 and the parameter adjusting unit 108, the parameter switching unit 106 may be adopted to switch the matching circuit to a set of matching parameters corresponding to a higher RSSI value under the current environment, so as to realize the automatic matching of the antennas more quickly.

The antenna matching method of the present invention is described as follows in conjunction with the aforementioned antenna matching structure.

Figure 7:
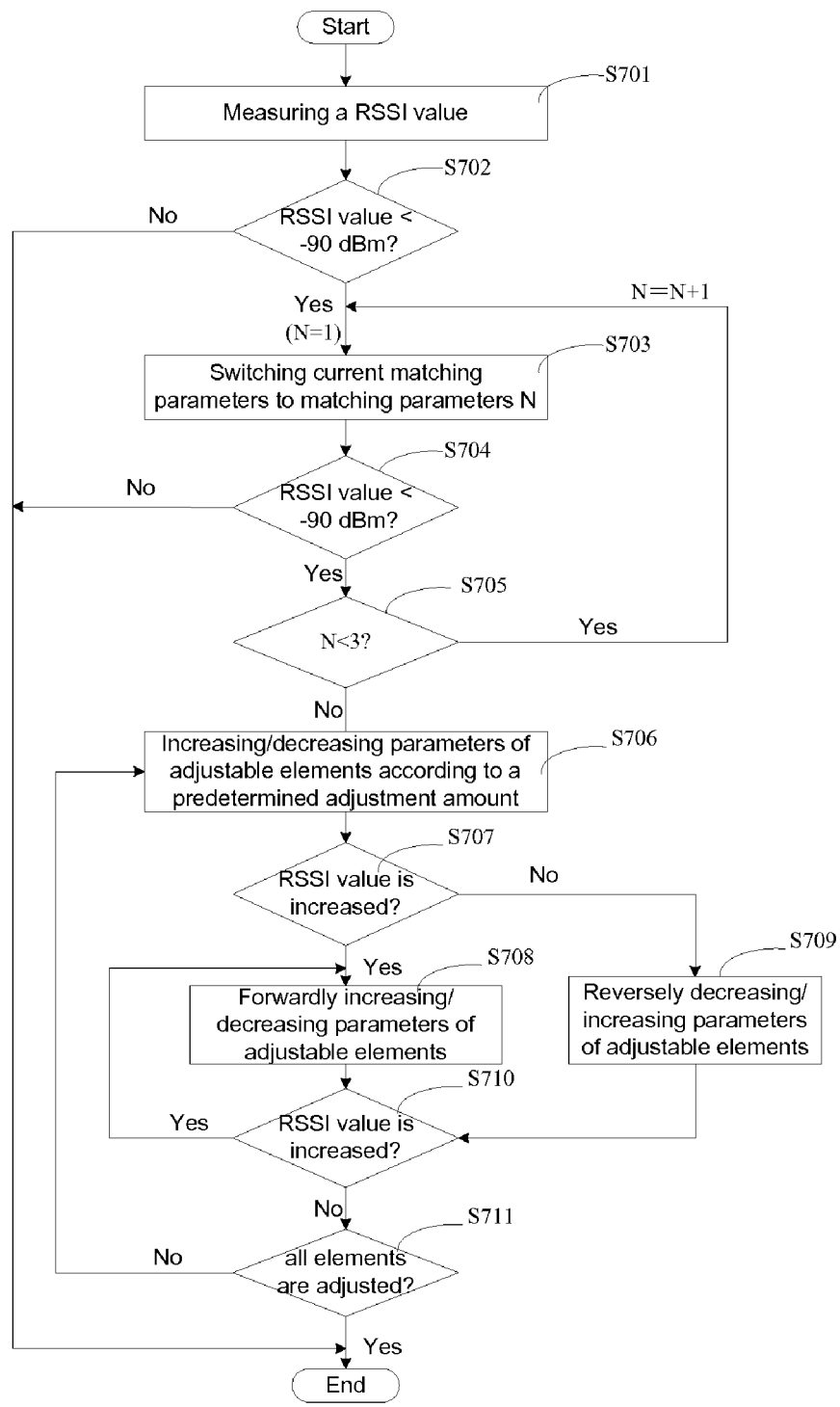
FIG. 7 is a flowchart of an antenna matching method according to an embodiment of the present invention.

FIG. 7 is a flowchart of an antenna matching method according to an embodiment of the present invention. As illustrated in FIG. 7, the method includes the following steps:

In step S701, the measuring unit 112 measures a RSSI value.

In step S702, the control circuit 111 determines whether the measured RSSI value is less than −90 dBm, and if so, goes to Step S703, otherwise ends the flow. The value −90 dBm is exemplary; other values may be used or chosen.

In step S703, the parameter switching unit 106 selects a set of matching parameters from predetermined at least one set of matching parameters, and switches current matching parameters of an adjustable antenna matching circuit to the selected matching parameters.

Assuming that the current working frequency band is UMTS I, and the matching parameters currently used by the terminal are the default parameters shown in Table 3. The parameter switching unit 106 for example selects matching parameters 1 from Table 1, and switches the default parameters to a set of matching parameters (e.g., matching parameters 1) among a plurality of sets of matching parameters corresponding to the different antenna working environments.

In step S704, the control unit 111 detects whether the measured RSSI value is less than −90 dBm, and if so, goes to step S705, and otherwise ends the flow.

In step S705, the control unit 111 detects whether all matching parameters (parameters 1 to 4) corresponding to different antenna working environments have undergone the switching, and if so, goes to step S706, otherwise continues performing step S703 to switch the current matching parameters to other matching parameters among the sets of matching parameters corresponding to different antenna working environments.

In step S706, a parameter adjusting unit 108 one-by-one adjusts (increases or decreases) parameters of various adjustable elements (capacitances or inductances) in the matching circuit according to a predetermined adjustment amount (a small amount).

In step S707, a change detecting unit 113 detects the change of the RSSI value after the parameters of the adjustable elements are increased or decreased, and if the RSSI value is increased, goes to step S708, otherwise goes to step S709.

In step S708, the parameter adjusting unit 108 forwardly adjusts (increases or decreases) the parameters of the adjustable elements.

In step S709, the parameter adjusting unit 108 reversely adjusts (increases or decreases) the parameters of the adjustable elements.

In step S710, the change detecting unit 113 continues to detect the change of the RSSI value, and if the RSSI value is increased, continues to perform step S708, otherwise goes to step S711.

In step S711, the parameter adjusting unit determines whether all adjustable elements are adjusted, and if so, ends the flow, otherwise returns to step S706.

Through the above flow, a higher RSSI value can be acquired quickly by switching and adjusting matching parameters when the RSSI value is less than the predetermined threshold, so as to obtain a better matching point for the antenna and improve the signal transmission quality.

In addition, before step S706, the matching parameters of the matching circuit may be switched to a set of matching parameters corresponding to a higher RSSI value under the current working frequency band and the current environment, and on this basis, the parameters of the adjustable elements are adjusted, thus the speed of the adjustment can be improved further.

In addition, before or after step S701, a terminal may perform a network search or a cell handover. With respect to the network search or the cell handover, the antenna matching method may further include the following steps in another embodiment of the present invention:

When the network search or the cell handover is carried out, the control unit 111 controls the parameter switching unit 106 to switch current matching parameters of the antenna matching circuit 102 to default matching parameters. The default matching parameters may be matching parameters general to the various bands, i.e., the compromised matching parameters for multiple bands in the prior art.

After the wireless communication terminal completes the network search or the cell handover, the control unit 111 controls the parameter switching unit 106 to switch the default matching parameters to a set of matching parameters corresponding to the current working frequency band. The set of matching parameters may be general matching parameters for the current working band itself (e.g., matching parameters 0 in Table 2), or one of a plurality of sets of matching parameters (e.g., matching parameters 1 to 4 in Table 2) corresponding to different antenna working environments under the current working frequency band.

In another embodiment of the present invention, before step S703 is performed, the antenna matching method of the present invention may further include: a detecting step that detects an antenna working environment of the terminal (not shown). The step for example may further include: detecting whether the wireless communication terminal is in a hand held state, detecting whether the terminal is in a call state, detecting whether the earphone interface is in a working state, and determining an antenna working environment according to the results of the above detections.

After the antenna working environment is detected, in step S703, the parameter switching unit 106 preferentially selects a set of matching parameters corresponding to the detected antenna working environment from the sets of matching parameters corresponding to different environments, and switches the current matching parameters to the selected matching parameters.

The method of the present invention is not limited to be executed according to the order as described herein, and can be executed in other order sequentially, concurrently or independently. Thus, the execution order of the method as described herein does not constitute a limitation to the technical scope of the present invention.

In addition, a person skilled in the art will understand that all or a part of the steps in the methods according to the above embodiments may be implemented by instructing relevant hardware through a program that is stored in a computer readable storage medium, such as ROM/RAM, magnetic disk, optical disk, etc.

Features described and/or illustrated with respect to one embodiment can be used in one or more other embodiments in a same or similar way, and/or combine with or replace features in other embodiments.

To be noted, the term "include/comprise/have" herein refers to existence of feature, component, step and assembly, not excluding existence or addition of one or more other features, components, steps, assemblies or a combination thereof.

The above embodiments make further and detailed descriptions of the object, technical solution and beneficial effect of the present invention. It shall be appreciated that, the above descriptions are just embodiments of the present invention, and do not limit the protection scope of the present invention. Any amendment, equivalent substitution, improvement, etc. made within the spirit and principle of the present invention shall be covered by the protection scope of the present invention.

What is claimed is:

1. An antenna matching structure for a wireless communication terminal, comprising an adjustable antenna matching circuit, wherein the antenna matching circuit comprises:

a measuring unit configured to measure a Received Signal Strength Indicator (RSSI) value;

a control unit configured to generate a first switching control signal when the RSSI value measured by the measuring unit is less than a predetermined threshold;

a parameter switching unit configured to select one set of matching parameters from predetermined at least one set of matching parameters according to the first switching control signal, and switch current matching parameters of the adjustable antenna matching circuit to the selected matching parameters; and an environment detecting unit configured to detect an antenna working environment of the wireless communication terminal;

wherein the parameter switching unit preferentially selects a set of matching parameters corresponding to the antenna working environment detected by the environment detecting unit, from the predetermined at least one set of matching parameters according to the first switching control signal, and switches current matching parameters of the adjustable antenna matching circuit to the selected matching parameters, wherein the environment detecting unit comprises:
at least one of:
a hand held state detecting unit configured to detect whether the wireless communication terminal is in a hand held state;
a call state detecting unit configured to detect whether the wireless communication terminal is in a call state; or
an earphone state detecting unit configured to detect whether an earphone interface is in an operation state; and
a determining unit configured to determine the antenna working environment according to the detection results of the at least one of the hand held state detecting unit, the call state detecting unit or the earphone state detecting unit.

2. The antenna matching structure according to claim 1, wherein the wireless communication terminal is a multiband wireless communication terminal.

3. The antenna matching structure according to claim 1, wherein the predetermined at least one set of matching parameters are at least one set of matching parameters corresponding to a current working frequency band.

4. The antenna matching structure according to claim 1, wherein
the control unit is further configured to generate a second switching control signal when the wireless communication terminal performs a network search or a cell handover; and
the parameter switching unit is further configured to switch current matching parameters of the adjustable antenna matching circuit to default matching parameters according to the second switching control signal.

5. The antenna matching structure according to claim 4, wherein
the control unit is further configured to generate a third switching control signal after the wireless communication terminal completes the network search or the cell handover; and
the parameter switching unit is further configured to switch the default matching parameters to a set of matching parameters corresponding to the current working frequency band according to the third switching control signal.

6. A wireless communication terminal provided with the antenna matching structure according to claim 1.

7. An antenna matching structure for a wireless communication terminal, comprising an adjustable antenna matching circuit, wherein the antenna matching circuit comprising:
a measuring unit configured to measure a Received Signal Strength Indicator (RSSI) value;
a control unit configured to generate a first switching control signal when the RSSI value measured by the measuring unit is less than a predetermined threshold;
a parameter switching unit configured to select one set of matching parameters from predetermined at least one set of matching parameters according to the first switching control signal, and switch current matching parameters of the adjustable antenna matching circuit to the selected matching parameters; and
a parameter adjusting unit and a change detecting unit;
the control unit is further configured to generate an adjustment control signal when the number of times of generating the first switching control signal exceeds a predetermined number of times, during a period of continuous receptions of RSSI values less than the predetermined threshold;

the parameter adjusting unit is configured to adjust matching parameters of adjustable elements in the adjustable antenna matching circuit based on a predetermined adjustment amount according to the adjustment control signal, and further forwardly or reversely adjust current matching parameters according to a forward adjustment signal or a reverse adjustment signal fed back by the change detecting unit; and
the change detecting unit is configured to, after the parameter adjusting unit adjusts matching parameters of the adjustable elements each time, detect a change of the RSSI value measured by the measuring unit, generate the forward adjustment signal or the reverse adjustment signal according to the change of the RSSI value, and feed back the generated forward adjustment signal or reverse adjustment signal to the parameter adjusting unit.

8. The antenna matching structure according to claim 7, wherein the at least one set of matching parameters are corresponding to at least one antenna working environment.

9. The antenna matching structure according to claim 7, further comprising an environment detecting unit configured to detect an antenna working environment of the wireless communication terminal;
the parameter switching unit preferentially selects a set of matching parameters corresponding to the antenna working environment detected by the environment detecting unit, from the predetermined at least one set of matching parameters according to the first switching control signal, and switches current matching parameters of the adjustable antenna matching circuit to the selected matching parameters.

10. The antenna matching structure according to claim 7, wherein the predetermined at least one set of matching parameters are at least one set of matching parameters corresponding to a current working frequency band.

11. A wireless communication terminal provided with the antenna matching structure according to claim 7.

12. An antenna matching method for a wireless communication terminal, comprising the steps of:
a measuring step: measuring a Received Signal Strength Indicator (RSSI) value;
a first switching step: selecting a set of matching parameters from predetermined at least one set of matching parameters when the measured RSSI value is less than a predetermined threshold, and switching current matching parameters of an adjustable antenna matching circuit to the selected matching parameters, wherein the at least one set of matching parameters are corresponding to at least one antenna working environment;
an environment detecting step: detecting an antenna working environment of the wireless communication terminal, wherein the environment detecting step comprises:
at least one of:
a hand held state detecting step that detects whether the wireless communication terminal is in a hand held state,
a call state detecting step that detects whether the wireless communication terminal is in a call state, or
an earphone state detecting step that detects whether an earphone interface is in an operation state; and
a step that determines the antenna working environment according to the detection results of the hand held state detecting step, the call state detecting step or the earphone state detecting step.

13. The method according to claim 12, wherein the predetermined at least one set of matching parameters are at least one set of matching parameters corresponding to a current working frequency band, when the wireless communication terminal is a multiband wireless communication terminal.

14. The method according to claim 12, further comprising:
a second switching step: switching current matching parameters of the adjustable antenna matching circuit to default matching parameters, when the wireless communication terminal performs a network search or a cell handover.

15. The method according to claim 12, wherein when the wireless communication terminal is a multiband wireless communication terminal, the method further comprising:
a third switching step: switching the default matching parameters to a set of matching parameters corresponding to the current working frequency band, after the wireless communication terminal completes a network search or a cell handover.

16. An antenna matching method for a wireless communication terminal, comprising the steps of:
measuring a Received Signal Strength Indicator (RSSI) value;
selecting a set of matching parameters from predetermined at least one set of matching parameters when the measured RSSI value is less than a predetermined threshold, and switching current matching parameters of an adjustable antenna matching circuit to the selected matching parameters;
adjusting matching parameters of adjustable elements in the adjustable antenna matching circuit based on a predetermined adjustment amount when the number of times of repeatedly performing the first switching step exceeds a predetermined number of times, during a period of continuous receptions of RSSI values less than the predetermined threshold; and
detecting a change of the RSSI value, and further forwardly or reversely adjusting matching parameters of the adjustable elements according to the change.

17. The method according to claim 16, wherein the at least one set of matching parameters are corresponding to at least one antenna working environment, and the method further comprising:
an environment detecting step: detecting an antenna working environment of the wireless communication terminal.

18. The method according to claim 17, comprising:
preferentially selecting a set of matching parameters corresponding to the antenna working environment detected by the environment detecting step, from the predetermined at least one set of matching parameters, and switching current matching parameters of the adjustable antenna matching circuit to the selected matching parameters.

19. The method of claim 16, wherein the predetermined at least one set of matching parameters are at least one set of matching parameters corresponding to a current working frequency band, when the wireless communication terminal is a multiband wireless communication terminal.

* * * * *